US012603664B2

(12) United States Patent
Ogata

(10) Patent No.: US 12,603,664 B2
(45) Date of Patent: Apr. 14, 2026

(54) FILTER APPARATUS AND RADIO-FREQUENCY FRONT END CIRCUIT INCLUDING THE SAME

(71) Applicant: Murata Manufacturing Co., Ltd., Nagaokakyo (JP)

(72) Inventor: Makoto Ogata, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 329 days.

(21) Appl. No.: 18/434,920

(22) Filed: Feb. 7, 2024

(65) Prior Publication Data

US 2024/0178866 A1 May 30, 2024

Related U.S. Application Data

(63) Continuation of application No. PCT/JP2022/024170, filed on Jun. 16, 2022.

(30) Foreign Application Priority Data

Aug. 12, 2021 (JP) ................................. 2021-131677

(51) Int. Cl.
*H04B 1/00* (2006.01)
*H04B 1/28* (2006.01)

(52) U.S. Cl.
CPC ............. *H04B 1/0078* (2013.01); *H04B 1/28* (2013.01)

(58) Field of Classification Search
CPC ................................. H04B 1/0078; H04B 1/28
See application file for complete search history.

(56) References Cited

U.S. PATENT DOCUMENTS 5,877,662 A * 3/1999 Kobayashi ........... H03H 9/6476
333/195
9,929,770 B2 * 3/2018 Onodera .............. H03H 9/6483
(Continued)

FOREIGN PATENT DOCUMENTS

JP 2017063394 A 3/2017
JP 2019103108 A 6/2019
(Continued)

OTHER PUBLICATIONS

International Search Report in PCT/JP2022/024170, mailed Sep. 13, 2022, 3 pages.
(Continued)

*Primary Examiner* — Junpeng Chen
(74) *Attorney, Agent, or Firm* — Keating & Bennett, LLP

(57) ABSTRACT

A filter apparatus includes a dielectric substrate, input and output terminals, a ground terminal, a common electrode, and first to fourth resonators. Each resonator is connected to the common electrode and the ground terminal. Third and fourth resonators are between first and second resonators. Each resonator includes a capacitor and first and second vias connected to the common electrode. The first via is connected to the ground terminal with the capacitor interposed therebetween. The second via is directly connected to the ground terminal. In the common electrode, a direction from the first via to the second via in the first resonator is opposite to a direction from the first via to the second via in the second resonator. In third and fourth resonators, a shortest path along the common electrode between the first vias intersects with a shortest path along the common electrode between the second vias.

20 Claims, 10 Drawing Sheets

(56) References Cited

U.S. PATENT DOCUMENTS

| | | | | |
|---|---|---|---|---|
| 2001/0022545 A1* | 9/2001 | Ohashi | ................. | H03H 9/6483 |
| | | | | 310/313 R |
| 2007/0001786 A1* | 1/2007 | Kundu | ................. | H03H 7/1708 |
| | | | | 333/204 |
| 2012/0313730 A1 | 12/2012 | Ootsuka | | |
| 2017/0093358 A1 | 3/2017 | Imamura | | |
| 2017/0155376 A1* | 6/2017 | Yamaguchi | .......... | H03H 9/0576 |
| 2019/0181826 A1 | 6/2019 | Imamura | | |
| 2019/0260343 A1 | 8/2019 | Shiokawa | | |
| 2019/0326884 A1* | 10/2019 | Nosaka | .................. | H03H 9/145 |
| 2021/0111742 A1* | 4/2021 | Hitomi | ................. | H04B 1/0064 |
| 2021/0234559 A1* | 7/2021 | Mori | ................... | H04B 1/0458 |
| 2021/0305669 A1* | 9/2021 | Yu | ....................... | H01P 1/20345 |
| 2022/0209736 A1* | 6/2022 | Ogawa | ................... | H01F 17/00 |

FOREIGN PATENT DOCUMENTS

| | | | |
|---|---|---|---|
| WO | 2012033137 A1 | 3/2012 | |
| WO | 2018092442 A1 | 5/2018 | |
| WO | 2019097774 A1 | 5/2019 | |

OTHER PUBLICATIONS

Written Opinion in PCT/JP2022/024170, mailed Sep. 13, 2022, 3 pages.

* cited by examiner

FILTER APPARATUS AND RADIO-FREQUENCY FRONT END CIRCUIT INCLUDING THE SAME

CROSS REFERENCE TO RELATED APPLICATIONS

This application claims the benefit of priority to Japanese Patent Application No. 2021-131677 filed on Aug. 12, 2021 and is a Continuation Application of PCT Application No. PCT/JP2022/024170 filed on Jun. 16, 2022. The entire contents of each application are hereby incorporated herein by reference.

BACKGROUND OF THE INVENTION

1. Field of the Invention

The present disclosure relates to filter apparatuses and radio-frequency front end circuits including the same, and more specifically to techniques to improve characteristics of the filter apparatuses.

2. Description of the Related Art

WO2019/097774 discloses a multilayer band pass filter in which LC parallel resonators in four stages are arranged between an input terminal and an output terminal. In the band pass filter in WO2019/097774, two capacitors (a first capacitor and a second capacitor) connected in series are provided between the resonator connected to the input terminal and the resonator connected to the output terminal, and a third capacitor is provided between a connection node between the two capacitors and a ground point. According to such a configuration, a frequency at an attenuation pole on a higher frequency side of a pass band can be varied with substantially no variation in frequency at an attenuation pole on a lower frequency side of the pass band.

In general, a filter apparatus is demanded to be low in insertion loss in a pass band and large in an amount of attenuation in a non-pass band. In the filter apparatus including the plurality of resonators as described above, the insertion loss and the amount of attenuation can be adjusted depending on a state of coupling between resonators. Generally, however, the insertion loss and the amount of attenuation are in a trade-off relationship. Thus, it may be difficult to improve both of these characteristics.

SUMMARY OF THE INVENTION

Example embodiments of the present invention provide filter apparatuses each including a plurality of resonators and each of which is able to reduce an insertion loss in a pass band and improve attenuation characteristics in a non-pass band.

A filter apparatus according to an example embodiment of the present invention includes a dielectric substrate including a first surface and a second surface, an input terminal, an output terminal, and a ground terminal on the second surface of the dielectric substrate, a common electrode inside of the dielectric substrate, and first to fourth resonators. Each of the first to fourth resonators is connected to the common electrode and the ground terminal. The first resonator is connected to the input terminal. The second resonator is connected to the output terminal. The third resonator and the fourth resonator are between the first resonator and the second resonator. Each of the first to fourth resonators includes a capacitor, a first via, and a second via. The first via includes one end connected to the common electrode and another end connected to the ground terminal with the capacitor interposed therebetween. The second via includes one end connected to the common electrode and another end connected to the ground terminal without the capacitor interposed therebetween. In the common electrode, a direction from the first via toward the second via in the first resonator is opposite to a direction from the first via toward the second via in the second resonator. A shortest path along the common electrode from the first via in the third resonator to the first via in the fourth resonator intersects with a shortest path along the common electrode from the second via in the third resonator to the second via in the fourth resonator.

In the filter apparatus including four resonators, each resonator is connected to the common electrode. Since a resistance value between the resonators is smaller than in an example where the resonators are not connected to one another, the insertion loss in the pass band is able to be reduced.

Since magnetic coupling between resonators is weakened by an arrangement of the via in the resonator (first resonator) in the first stage being opposite to an arrangement of the via in the resonator (second resonator) in the fourth stage, the amount of attenuation on a lower frequency side of the pass band is increased. Furthermore, in the resonator (third resonator) in the second stage and the resonator (fourth resonator) in the third stage, the shortest path between the first vias along the common electrode intersects with the shortest path between the second vias along the common electrode. A resonator with a small inductance value and a large capacitance value is thus able to be obtained.

Therefore, in each of filter apparatuses including the plurality of resonators according to example embodiments of the present disclosure, the insertion loss in the pass band is able to be reduced and attenuation characteristics in the non-pass band are able to be improved.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
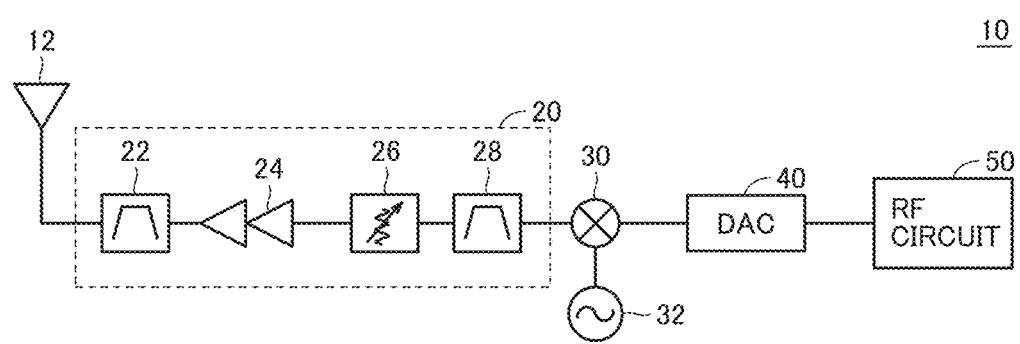
FIG. 1 is a block diagram of a communication apparatus including a radio-frequency front end circuit to which a filter apparatus according to a first example embodiment of the present invention is applied.

Example embodiments of the present invention and modifications or combinations thereof will be described in detail below with reference to the drawings. The same or corresponding elements in the drawings are denoted by the same reference characters and description thereof will not be repeated.

First Example Embodiment

Basic Configuration of Communication Apparatus

FIG. 1 is a block diagram of a communication apparatus 10 including a radio-frequency front end circuit 20 to which a filter apparatus according to a first example embodiment of the present invention is applied. Communication apparatus 10 is, for example, a cellular base station.

Referring to FIG. 1, communication apparatus 10 includes an antenna 12, radio-frequency front end circuit 20, a mixer 30, a local oscillator 32, a D/A converter (DAC) 40, and an RF circuit 50. Radio-frequency front end circuit 20 includes band pass filters 22 and 28, an amplifier, 24, and an attenuator 26. Although FIG. 1 illustrates an example in which radio-frequency front end circuit 20 includes a transmission circuit that transmits a radio-frequency signal from antenna 12, radio-frequency front end circuit 20 may include a reception circuit that receives a radio-frequency signal through antenna 12.

Communication apparatus 10 up-converts a transmission signal transmitted from RF circuit 50 to a radio-frequency signal and radiates the radio-frequency signal from antenna 12. A modulated digital signal which is the transmission signal outputted from RF circuit 50 is converted to an analog signal by D/A converter 40. Mixer 30 mixes the transmission signal converted from the digital signal to the analog signal by D/A converter 40 with an oscillation signal from local oscillator 32 to up-convert the transmission signal to a radio-frequency signal. Band pass filter 28 removes spurious waves caused by up-conversion and extracts only the transmission signal in a desired frequency band. Attenuator 26 adjusts intensity of the transmission signal. Amplifier 24 amplifies power of the transmission signal that has passed through attenuator 26 to a prescribed level. Band pass filter 22 removes spurious waves caused in an amplification process and allows passage only of a signal component in a frequency band defined under communication standards. The transmission signal that has passed through band pass filter 22 is radiated from antenna 12.

The filter apparatus according to present example embodiment can be used, for example, as band pass filters 22 and 28 in communication apparatus 10 as described above.
Configuration of Filter Apparatus A detailed configuration of filter apparatus 100 in the first example embodiment will now be described with reference to FIGS. 2 to 5.

Figure 2:
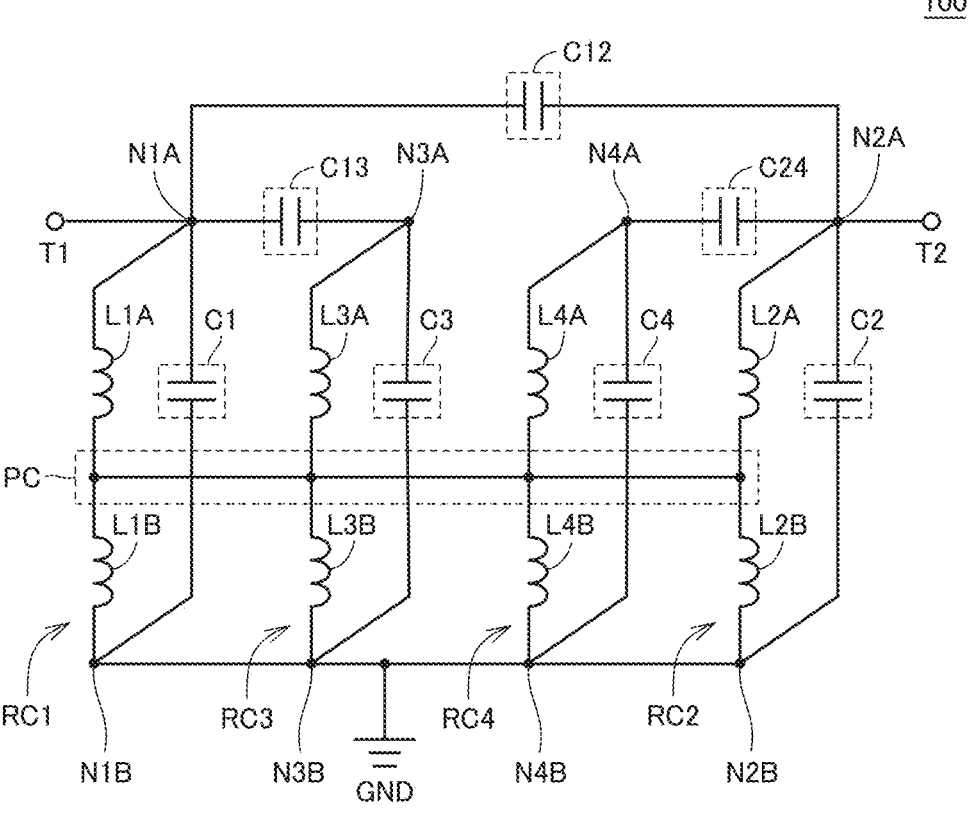
FIG. 2 is an equivalent circuit diagram of the filter apparatus in the first example embodiment of the present invention.

FIG. 2 is an equivalent circuit diagram of filter apparatus 100. Referring to FIG. 2, filter apparatus 100 includes an input terminal T1, an output terminal T2, and resonators RC1 to RC4. Each of resonators RC1 to RC4 is an LC parallel resonator in which an inductor and a capacitor are connected in parallel.

Resonator RC1 includes inductors LIA and LIB connected in series between input terminal T1 and a ground terminal GND, and a capacitor C1 connected in parallel to inductors LIA and LIB. A connection node NIA between inductor LIA and capacitor C1 is connected to input terminal T1. A connection node NIB between inductor LIB and capacitor C1 is connected to ground terminal GND.

Resonator RC2 includes inductors L2A and L2B connected in series between output terminal T2 and ground terminal GND, and a capacitor C2 connected in parallel to inductors L2A and L2B. A connection node N2A between inductor L2A and capacitor C2 is connected to output terminal T2. A connection node N2B between inductor L2B and capacitor C2 is connected to ground terminal GND.

Resonator RC3 includes inductors L3A and L3B connected in series and a capacitor C3 connected in parallel to inductors L3A and L3B. A connection node N3A between inductor L3A and capacitor C3 is connected to connection node NIA (that is, input terminal T1) of resonator RC1 with a capacitor C13 interposed therebetween. A connection node N3B between inductor L3B and capacitor C3 is connected to ground terminal GND.

Resonator RC4 includes inductors L4A and L4B connected in series and a capacitor C4 connected in parallel to inductors L4A and L4B. A connection node N4A between inductor L4A and capacitor C4 is connected to connection node N2A (that is, output terminal T2) of resonator RC2 with a capacitor C24 interposed therebetween. A connection node N4B between inductor L4B and capacitor C4 is connected to ground terminal GND.

Connection node NIA (input terminal T1) of resonator RC1 and connection node N2A (output terminal T2) of resonator RC2 are connected to each other with a capacitor C12 interposed therebetween. Nodes of connection between two inductors in the resonators are connected to one another. A portion where the resonators are connected in common corresponds to a common electrode PC which will be described later with reference to FIG. 4 or the like.

Resonators are coupled to each other by magnetic coupling. Filter apparatus 100 is thus configured such that resonators in four stages magnetically coupled to one another are arranged between input terminal T1 and output terminal T2. By adjusting a resonance frequency of each resonator, filter apparatus 100 defines and functions as a band pass filter that allows passage of a signal in a desired frequency band.

Figure 3:
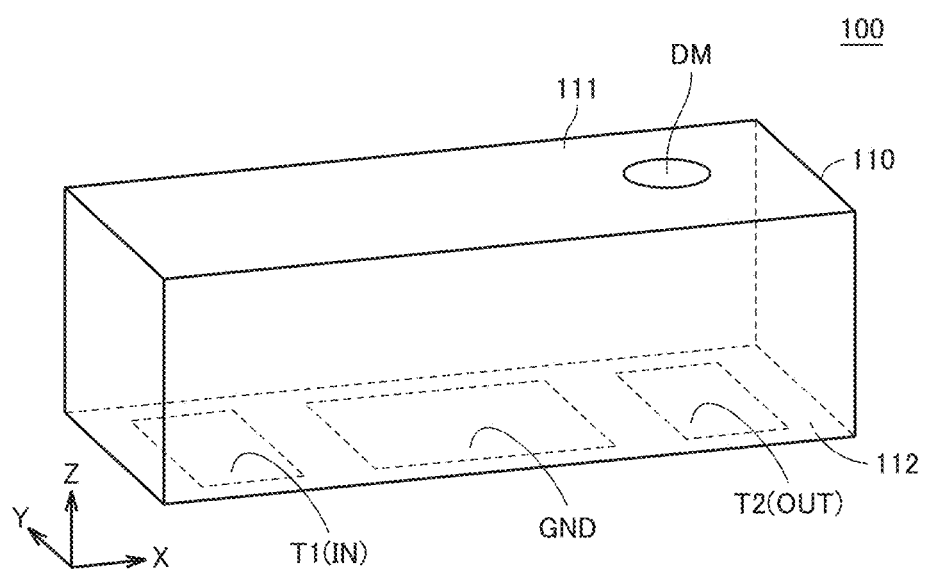
FIG. 3 is an external perspective view of the filter apparatus in the first example embodiment of the present invention.
Figure 4:
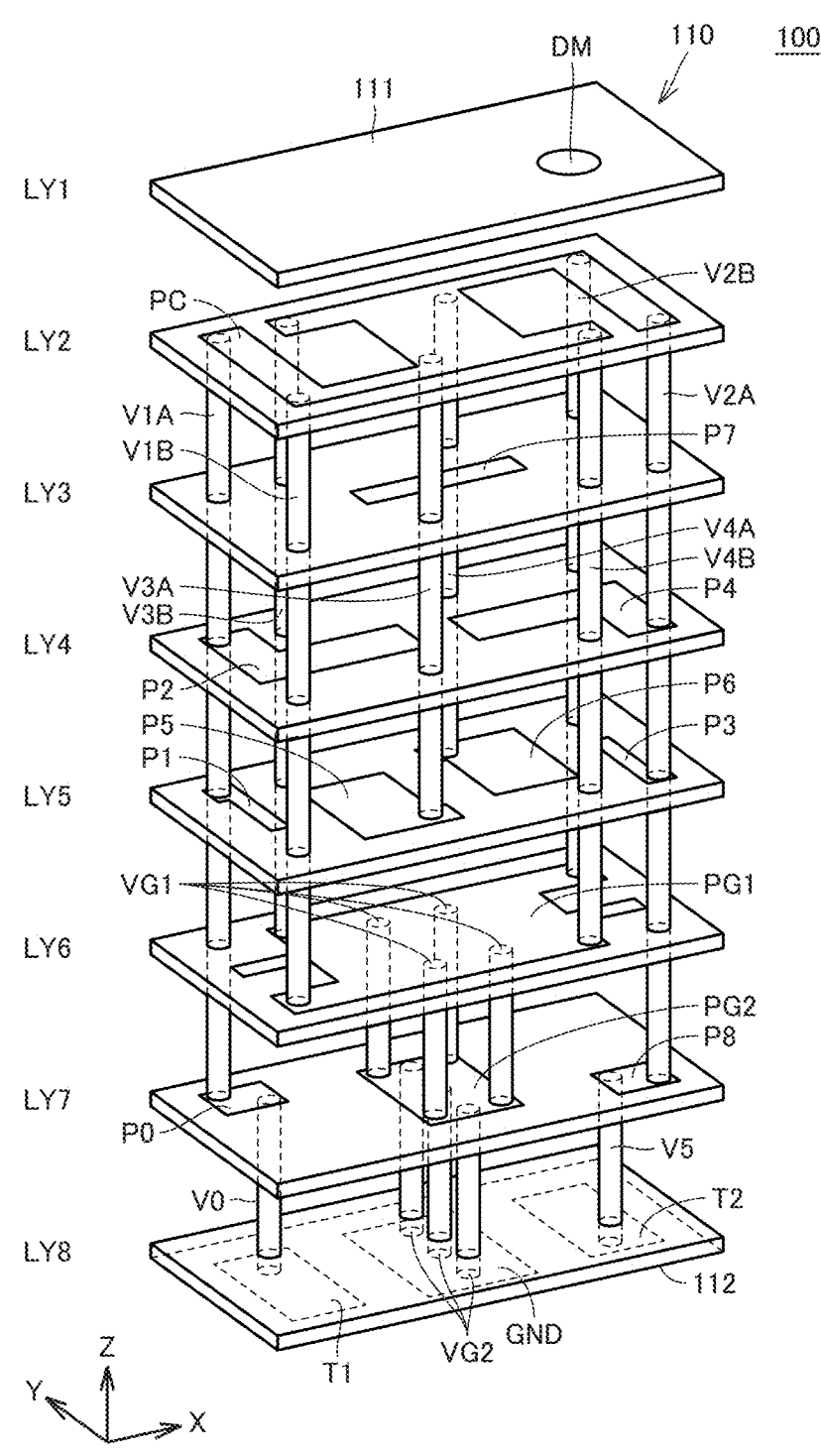
FIG. 4 is an exploded perspective view showing an exemplary multilayer structure of the filter apparatus in the first example embodiment of the present invention.

FIG. 3 is an external perspective view of filter apparatus 100 and FIG. 4 is an exploded perspective view showing an exemplary multilayer structure of filter apparatus 100.

Referring to FIGS. 3 and 4, filter apparatus 100 includes a dielectric substrate 110 with a cuboid or substantially cuboid shape. Dielectric substrate 110 includes a plurality of dielectric layers LY1 to LY8 layered in a layering direction. Dielectric layers LY1 to LY8 are made of a resin or ceramic such as low temperature co-fired ceramics (LTCC), for example. In the inside of dielectric substrate 110, the inductors and the capacitors of the LC parallel resonator includes a plurality of electrodes provided in the dielectric layers and a plurality of vias provided between the dielectric layers. The "via" herein refers to a conductor provided in a dielectric layer to connect between electrodes provided in different dielectric layers. The via is made of, for example, a conductive paste, plating, and/or a metallic pin.

In the description below, a layering direction of dielectric layers LY1 to LY8 in dielectric substrate 110 is defined as a "Z-axis direction," a direction along a long side of dielectric substrate 110 which is perpendicular or substantially perpendicular to the Z-axis direction is defined as an "X-axis direction," and a direction along a short side of dielectric substrate 110 is defined as a "Y-axis direction." A positive direction along the Z axis in each figure may be referred to as an upper side, and a negative direction may be referred to as a lower side below.

A directional mark DM to specify a direction of filter apparatus 100 is provided on an upper surface 111 (dielectric layer LY1) of dielectric substrate 110. External terminals (input terminal T1, output terminal T2, and ground terminal GND) to connect between filter apparatus 100 and an external apparatus are provided on a lower surface 112 (dielectric layer LY8) of dielectric substrate 110. Input terminal T1, output terminal T2, and ground terminal GND are each an electrode with a flat plate shape, and they are land grid array (LGA) terminals regularly arranged on lower surface 112 of dielectric substrate 110. "Upper surface 111" and "lower surface 112" in the first example embodiment correspond to the "first surface" and the "second surface", respectively.

As described with reference to FIG. 2, filter apparatus 100 includes LC parallel resonators in four stages. More specifically, the filter apparatus includes resonator RC1 including vias V1A and V1B and a capacitor electrode P1, resonator RC2 including vias V2A and V2B and a capacitor electrode P3, resonator RC3 including vias V3A and V3B and a capacitor electrode P5, and resonator RC4 including vias V4A and V4B and a capacitor electrode P6. Each of vias V1A, V1B, V2A, V2B, V3A, V3B, V4A, and V4B is connected to common electrode PC in dielectric layer LY2. Vias V1B, V2B, V3B, and V4B are also connected to a ground electrode PG1 in dielectric layer LY6. Ground electrode PG1 is connected to a ground electrode PG2 in dielectric layer LY7 through a plurality of vias VG1. Ground electrode PG2 is connected to ground terminal GND in dielectric layer LY8 through a plurality of vias VG2. Capacitor electrodes P1, P3, P5, and P6 are provided in dielectric layer LY5.

Input terminal T1 is connected, through a via V0, to a plate electrode P0 in dielectric layer LY7. Plate electrode P0 is connected, through via V1A, to common electrode PC in dielectric layer LY2. Via V1A is also connected to capacitor electrode P1 in dielectric layer LY5 and capacitor electrode P2 in dielectric layer LY4. As described above, common electrode PC is connected to ground electrode PG1 in dielectric layer LY6 through via V1B.

When dielectric substrate 110 is viewed in the plan view from the layering direction (Z-axis direction), a portion of capacitor electrode P1 overlaps with ground electrode PG1 in dielectric layer LY6. Capacitor C1 in FIG. 2 includes capacitor electrode P1 and ground electrode PG1. Inductors LIA and LIB in FIG. 2 include vias V1A and V1B and common electrode PC. In other words, resonator RC1 includes capacitor electrode P1, ground electrode PG1, vias V1A and V1B, and common electrode PC.

Output terminal T2 is connected, through a via V5, to a plate electrode P8 arranged in dielectric layer LY7. Plate electrode P8 is connected, through via V2A, to common electrode PC in dielectric layer LY2. Via V2A is connected also to capacitor electrode P3 arranged in dielectric layer LY5 and a capacitor electrode P4 arranged in dielectric layer LY4. As described above, common electrode PC is connected to ground electrode PG1 in dielectric layer LY6 through via V2B.

When dielectric substrate 110 is viewed in the plan view, a part of capacitor electrode P3 overlaps with ground electrode PG1 in dielectric layer LY6. Capacitor C2 in FIG. 2 includes capacitor electrode P3 and ground electrode PG1. Inductors L2A and L2B in FIG. 2 include vias V2A and V2B and common electrode PC. In other words, resonator RC2 includes capacitor electrode P3, ground electrode PG1, vias V2A and V2B, and common electrode PC.

When dielectric substrate 110 is viewed in the plan view, capacitor electrode P2 arranged in dielectric layer LY4 partially overlaps with capacitor electrode P5 arranged in dielectric layer LY5. Capacitor C13 in FIG. 2 includes capacitor electrode P2 and capacitor electrode P5.

When dielectric substrate 110 is viewed in the plan view, a portion of capacitor electrode P5 overlaps with ground electrode PG1 in dielectric layer LY6. Capacitor C3 in FIG. 2 includes capacitor electrode P5 and ground electrode PG1. Capacitor electrode P5 is connected to common electrode PC in dielectric layer LY2 through via V3A. As described above, common electrode PC is connected to ground electrode PG1 through via V3B. In other words, inductors L3A and L3B in FIG. 2 include vias V3A and V3B and common electrode PC. In other words, resonator RC3 includes capacitor electrode P5, ground electrode PG1, vias V3A and V3B, and common electrode PC.

When dielectric substrate 110 is viewed in the plan view, capacitor electrode P4 in dielectric layer LY4 partially overlaps with capacitor electrode P6 in dielectric layer LY5. Capacitor C24 in FIG. 2 includes capacitor electrode P4 and capacitor electrode P6.

When dielectric substrate 110 is viewed in the plan view, a portion of capacitor electrode P6 overlaps with ground electrode PG1 in dielectric layer LY6. Capacitor C4 in FIG. 2 includes capacitor electrode P6 and ground electrode PG1. Capacitor electrode P6 is connected to common electrode PC in dielectric layer LY2 through via V4A. As described above, common electrode PC is connected to ground electrode PG1 through via V4B. In other words, inductors L4A and L4B in FIG. 2 include vias V4A and V4B and common electrode PC. In other words, resonator RC4 includes capacitor electrode P6, ground electrode PG1, vias V4A and V4B, and common electrode PC.

When dielectric substrate 110 is viewed in the plan view, each of capacitor electrode P2 and capacitor electrode P4 in dielectric layer LY4 partially overlaps with a capacitor electrode P7 in dielectric layer LY3. Capacitor C12 in FIG. 2 includes capacitor electrodes P2, P4, and P7.

In the description below, via V1A, V2A, V3A, or V4A connected to ground terminal GND with the capacitor interposed therebetween in each resonator is referred to as the "first via." Via V1B, V2B, V3B, or V4B connected to ground terminal GND without the capacitor interposed therebetween in each resonator is referred to as the "second via."

Figure 5:
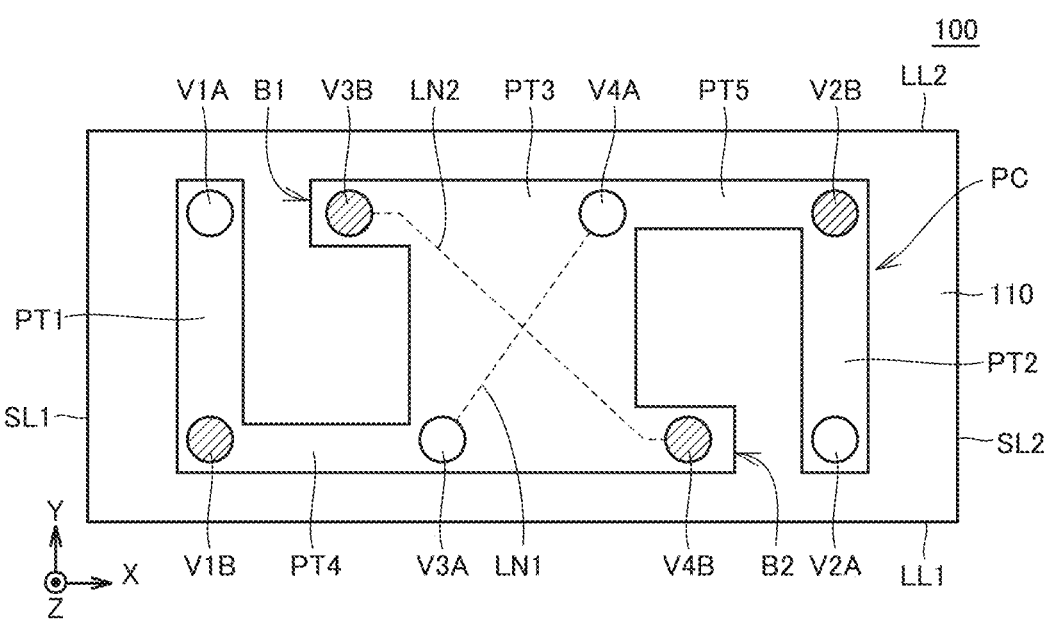
FIG. 5 is a plan view of a common electrode in the filter apparatus in the first example embodiment of the present invention.

FIG. 5 is a plan view of common electrode PC in dielectric layer LY2 in filter apparatus 100. When dielectric substrate 110 is viewed from a normal direction (Z-axis direction), dielectric substrate 110 has a rectangular or substantially rectangular shape including long sides LL1 and LL2 and short sides SL1 and SL2. Long sides LL1 and LL2 are sides along the X axis and short sides SL1 and SL2 are sides along the Y-axis direction. Long sides LL1 and LL2 correspond to the "first long side" and the "second long side", respectively. Short sides SL1 and SL2 correspond to the "first short side" and the "second short side" respectively.

Common electrode PC includes plate electrodes PT1 to PT3. Vias V1A and V1B included in resonator RC1 are connected to plate electrode PT1. Vias V2A and V2B included in resonator RC2 are connected to plate electrode PT2. Vias V3A, V3B, V4A, and V4B included in resonators RC3 and RC4 are connected to plate electrode PT3. Plate electrodes PT1 and PT2 are band-shaped electrodes that extend along short sides SL1 and SL2, respectively. Plate electrode PT3 is provided between plate electrode PT1 and plate electrode PT2 and has a rectangular or substantially rectangular shape.

Plate electrode PT1 is connected to plate electrode PT3 by a plate electrode PT4. Plate electrode PT4 extends from an end of plate electrode PT1 in the negative direction of the Y axis along long side LL1. Plate electrode PT2 is connected to plate electrode PT3 by a plate electrode PT5. Plate electrode PT5 extends from an end of plate electrode PT2 in the positive direction of the Y axis along long side LL2. In other words, common electrode PC has an S or substantially S shape and connects vias V1A, V1B, V2A, V2B, V3A, V3B, V4A, and V4B to one another. Common electrode PC thus connects four resonators RC1 to RC4 to one another.

Via V1A corresponding to the first via in resonator RC1 is connected to an open end of plate electrode PT1, that is, the end in the positive direction of the Y axis. Via V1B corresponding to the second via in resonator RC1 is connected to an end of plate electrode PT1 in the negative direction of the Y axis. Via V2A corresponding to the first via in resonator RC2 is connected to an open end of plate electrode PT2, that is, the end in the negative direction of the Y axis. Via V2B corresponding to the second via in resonator RC2 is connected to an end of plate electrode PT2 in the positive direction of the Y axis.

Plate electrode PT3 includes a projection B1 and a projection B2. Projection B1 projects from an end in the positive direction of the Y axis in a side opposed to plate electrode PT1 toward plate electrode PT1. Projection B2 projects from an end in the negative direction of the Y axis in a side opposed to plate electrode PT2 toward plate electrode PT2. Via V3A corresponding to the first via in resonator RC3 is connected to a portion of connection of plate electrode PT3 to plate electrode PT4. Via V3B corresponding to the second via in resonator RC3 is connected to projection B1. Via V4A corresponding to the first via in resonator RC4 is connected to a portion of connection of plate electrode PT3 to plate electrode PT5. Via V4B corresponding to the second via in resonator RC4 is connected to projection B2. In other words, a shortest path LN1 from via V3A to via V4A intersects with a shortest path LN2 from via V3B to via V4B in plate electrode PT3.

The arrangement of the vias in resonator RC3 is thus reverse to the arrangement of the vias in resonator RC4 in plate electrode PT3, so that a direction of electromagnetic field generated in resonator RC3 is opposite to a direction of electromagnetic field generated in resonator RC4. Therefore, magnetic coupling between resonator RC3 and resonator RC4 is weaker than in an example where the arrangement of the vias is the same in the resonators. Consequently, electric field coupling between resonator RC1 and resonator RC2 is dominant.

In general, in a filter apparatus including resonators in four stages, coupling between the resonator in the first stage and the resonator in the fourth stage is associated with generation of an attenuation pole in a non-pass band on a lower frequency side of the pass band. When electric field coupling between the resonators becomes more dominant than magnetic coupling, an amount of attenuation at the attenuation pole tends to be large (deep). Therefore, the arrangement of the vias in resonator RC3 being reverse to the arrangement of the vias in resonator RC4 as in filter apparatus 100 can make the amount of attenuation on the lower frequency side of the pass band larger than in the example where the arrangement of the vias in resonator RC3 is the same as the arrangement of the vias in resonator RC4.

On the other hand, in the filter apparatus including the resonators in the four stages, coupling between the resonator in the first stage and the resonator in the third stage and coupling between the resonator in the second stage and the resonator in the fourth stage are associated with generation of the attenuation pole in the non-pass band on the higher frequency side of the pass band. When magnetic coupling between the resonators becomes stronger, the amount of attenuation at the attenuation pole tends to be larger. In filter apparatus 100, the arrangement of the vias in resonator RC1 is the same as the arrangement of the vias in resonator RC4, and the arrangement of the vias in resonator RC2 is the same as the arrangement of the vias in resonator RC3. Thus, magnetic coupling is more dominant than electric field coupling between resonator RC1 and resonator RC4 and between resonator RC2 and resonator RC3. Therefore, the amount of attenuation at the attenuation pole in the non-pass band on the higher frequency side of the pass band can be increased.

Furthermore, in filter apparatus 100, in connection with resonator RC3 and resonator RC4, shortest path LN1 from via V3A in resonator RC3 to via V4A in resonator RC4 intersects with shortest path LN2 from via V3B in resonator RC3 to via V4B in resonator RC4. In other words, the arrangement of the vias in resonator RC3 is reverse to the arrangement of the vias in resonator RC4. Resonators RC3 and RC4 having a small inductance value and a large capacitance value can thus be obtained. A ratio between the inductance value and the capacitance value can be adjusted without changing an air-core diameter of inductors L3A and L3B including vias V3A and V3B and common electrode PC and inductors L4A and L4B including vias V4A and V4B and common electrode PC, resulting in an inductor having a high Q factor.

Coupling between the resonator in the second stage and the resonator in the third stage is associated with a bandwidth in the pass band, and it has been known that the bandwidth in the pass band is larger as magnetic coupling between the resonators increases. The arrangement of the vias in resonator RC3 is reverse to the arrangement of the vias in resonator RC4 in filter apparatus 100. Therefore, under such a condition, electromagnetic fields generated by the resonators cancel each other, which weakens magnetic coupling. Since vias V3B and V4B corresponding to the second vias are provided in projections B1 and B2 in filter apparatus 100, respectively, shortest path LN2 between the second vias is longer than shortest path LN1 between the first vias. According to such a configuration, magnetic coupling is more dominant than electric field coupling between resonators RC3 and RC4, and thus a decrease in bandwidth in the pass band can be reduced or prevented.

Filter Characteristics

Figure 6:
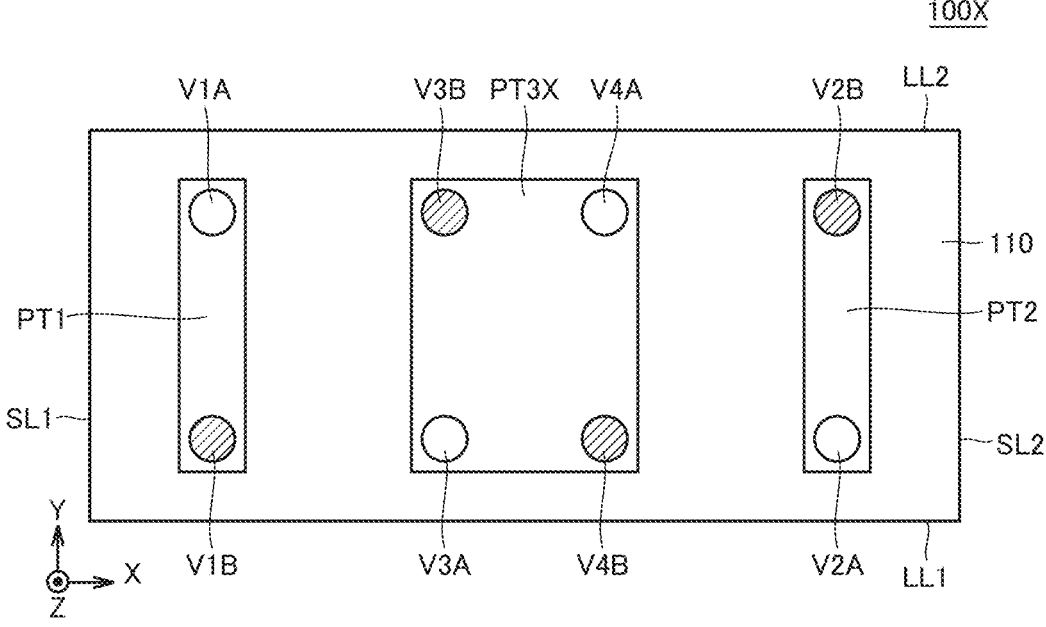
FIG. 6 is a diagram for illustrating arrangement of a resonator in a filter apparatus in a comparative example.

Filter characteristics of filter apparatus 100 in the first example embodiment will now be described with reference to a comparative example. FIG. 6 is a diagram showing the configuration of a resonator in a filter apparatus 100X in the comparative example. Filter apparatus 100X is different in not including common electrode PC in dielectric layer LY2 in filter apparatus 100, and otherwise has the same or similar configuration to filter apparatus 100.

More specifically, since filter apparatus 100X does not include the common electrode, resonator RC1 connected to input terminal T1 and resonator RC2 connected to output terminal T2 are not connected to resonators RC3 and RC4 but are individually provided. In other words, filter apparatus 100X is configured such that plate electrodes PT4 and PT5 in common electrode PC in filter apparatus 100 are removed. Furthermore, in filter apparatus 100X, projections B1 and B2 are not provided in a plate electrode PT3X connected to resonators RC3 and RC4 as in plate electrode PT3 in filter apparatus 100, and a distance between via V3A and via V4A is the same or substantially the same as a distance between via V3B and via V4B.

Figure 7:
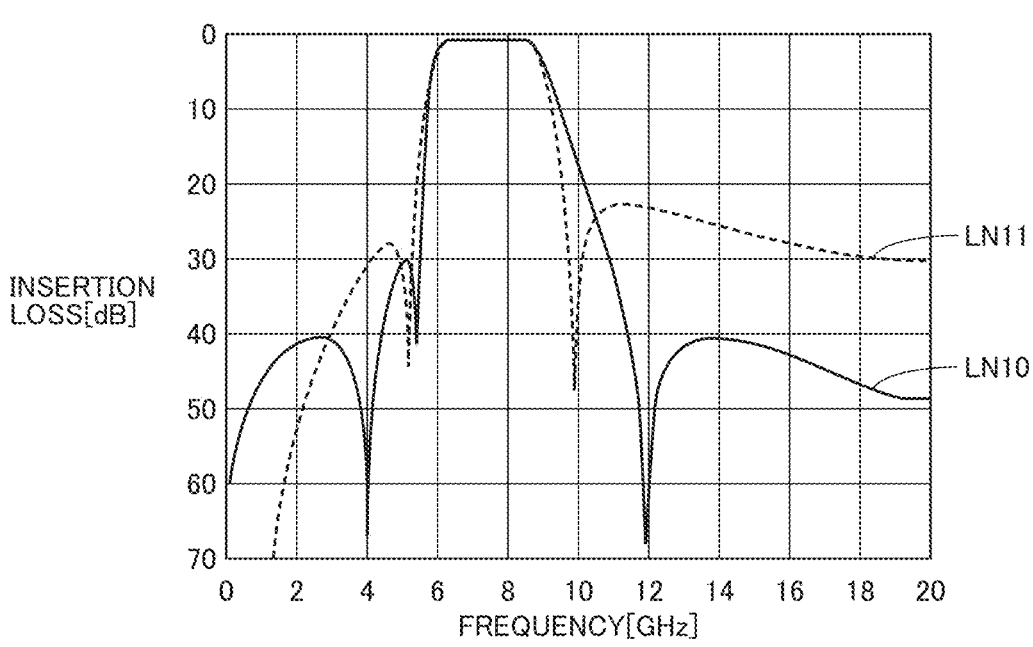
FIG. 7 is a diagram showing pass characteristics of the filter apparatus in the first example embodiment of the present invention.

FIG. 7 is a diagram for illustrating pass characteristics of filter apparatus 100 in the first example embodiment. FIG. 7 shows insertion losses in filter apparatus 100 in the first example embodiment and filter apparatus 100X in the comparative example. In FIG. 7, a solid line LN10 represents the insertion loss in filter apparatus 100 and a dashed line LN11 represents the insertion loss in filter apparatus 100X in the comparative example.

As shown in FIG. 7, it can be seen that filter apparatus 100 in the first example embodiment has a larger frequency bandwidth within which the insertion loss not higher than about 3 dB can be achieved than filter apparatus 100X. In addition, filter apparatus 100 in the first example embodiment has a larger amount of attenuation at the attenuation pole on the higher frequency side of the pass band compared to the comparative example. Attenuation characteristics on the higher frequency side of the pass band are thus improved.

Furthermore, regarding the attenuation characteristics on the lower frequency side of the pass band, frequencies at two attenuation poles are closer to the pass band compared to the comparative example, which improves a degree of steepness of attenuation.

According to the configuration of filter apparatus 100 in the first example embodiment, filter apparatus 100 in the first example embodiment has improved insertion loss in the pass band and bandwidth and improved attenuation characteristics in the non-pass band than filter apparatus 100X in the comparative example.

MODIFICATIONS

Modifications of filter apparatus 100 in the first example embodiment will be described with reference to FIGS. 8 to 14.

(1) First Modification

A first modification illustrates a configuration to further increase the bandwidth of the pass band.

Figure 8:
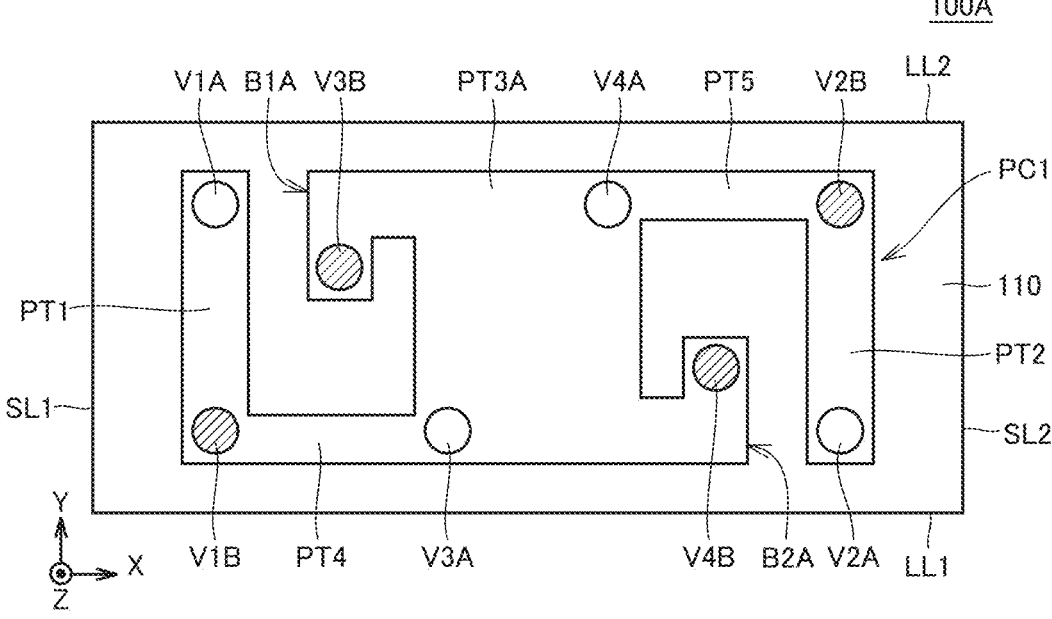
FIG. 8 is a plan view of a common electrode in a filter apparatus in a first modification of an example embodiment of the present invention.

FIG. 8 is a plan view of a common electrode PC1 in a filter apparatus 100A in the first modification. Filter apparatus 100A is configured such that common electrode PC in filter apparatus 100 is replaced with common electrode PC1. Description of elements in filter apparatus 100A the same as or similar to those in filter apparatus 100 will not be repeated.

Referring to FIG. 8, common electrode PC1 in filter apparatus 100A is different in that a plate electrode PT3A to which vias V3A, V3B, V4A, and V4B included in resonators RC3 and RC4 are connected has a different shape from plate electrode PT3 in filter apparatus 100. More specifically, projections B1A and B2A in plate electrode PT3A each have an L or substantially L shape. Projection B1A projects from the end in the positive direction of the Y axis in the side opposed to plate electrode PT1 toward plate electrode PT1, and is further bent in the negative direction of the Y axis in plate electrode PT3A. Via V3B of resonator RC3 is connected to an open end portion of bent projection B1A.

Similarly, projection B2A projects from the end in the negative direction of the Y axis in the side opposed to plate electrode PT2 toward plate electrode PT2, and is further bent in the positive direction of the Y axis in plate electrode PT3A. Via V4B of resonator RC4 is connected to an open end portion of bent projection B2A.

According to such a configuration, a length of the shortest path between via V3B in resonator RC3 and via V4B in resonator RC4 along plate electrode PT3A can be longer than that in filter apparatus 100. Since magnetic coupling between resonators RC3 and RC4 can thus further be stronger than in filter apparatus 100, the bandwidth of the pass band can be larger.

(2) Second Modification

A second modification illustrates adjustment of a degree of coupling between resonator RC1 and resonator RC2 by adjustment of the common electrode.

Figure 9:
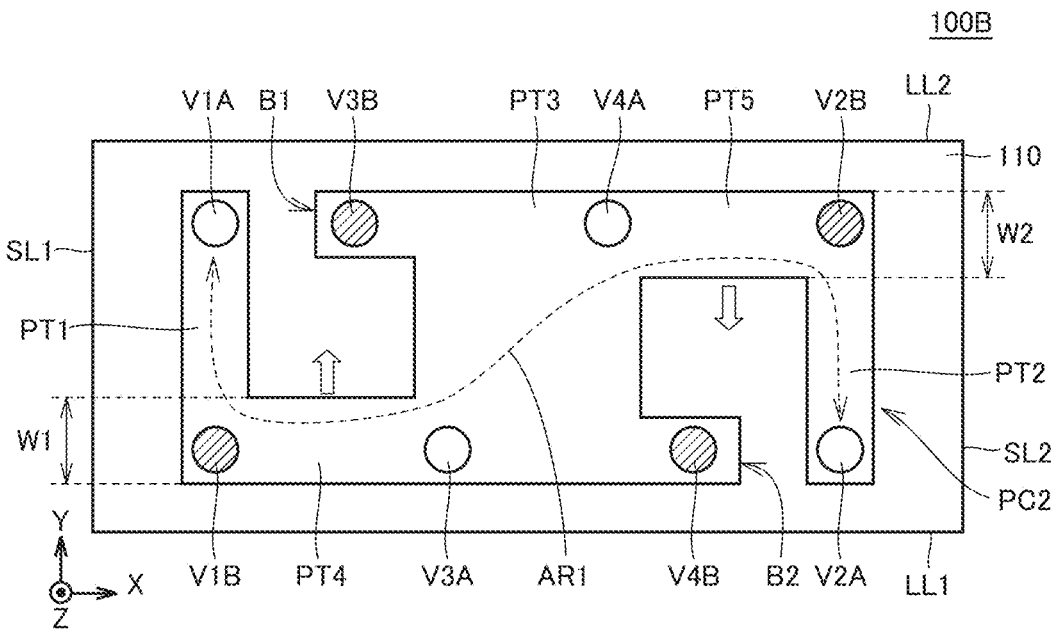
FIG. 9 is a plan view of a common electrode in a filter apparatus in a second modification of an example embodiment of the present invention.

FIG. 9 is a plan view of a common electrode PC2 in a filter apparatus 100B in the second modification. Filter apparatus 100B is configured such that common electrode PC in filter apparatus 100 is replaced with common electrode PC2. Description of elements in filter apparatus 100B the same as or similar to those in filter apparatus 100 will not be repeated.

Referring to FIG. 9, in common electrode PC2 in filter apparatus 100B, a line width W1 of plate electrode PT4 and a line width W2 of plate electrode PT5 are larger than those in common electrode PC in filter apparatus 100. By thus increasing line width W1 of plate electrode PT4 and/or line width W2 of plate electrode PT5, a shortest distance (an arrow AR1) between via V1A connected to input terminal T1 and via V2A connected to output terminal T2 can be shorter than in filter apparatus 100. In other words, magnetic coupling between resonators RC1 and RC2 can be strengthened to adjust the attenuation pole on the lower frequency side of the pass band.

As set forth above, in the configuration in the first example embodiment, the arrangement of the vias in resonator RC1 is reverse to the arrangement of the vias in resonator RC2 so as to weaken magnetic coupling. When relaxation of a degree of magnetic coupling is desired, however, adjustment can be made to achieve desired magnetic coupling, by increase in line width W1 of plate electrode PT4 and/or line width W2 of plate electrode PT5.

An increase in line width W1 of plate electrode PT4 and/or line width W2 of plate electrode PT5 results in a smaller inductance value of a path from input terminal T1 to output terminal T2, so that a return loss in the pass band can be adjusted.

In order to ensure symmetry the of filter characteristics, line width W1 of plate electrode PT4 is preferably equal or substantially equal to line width W2 of plate electrode PT5 (W1=W2). When weakening of magnetic coupling is desired, line width W1 of plate electrode PT4 and/or line width W2 of plate electrode PT5 may be set to be smaller than in filter apparatus 100.

(3) Third Modification

The second modification illustrates the configuration in which adjustment of the line width of plate electrode PT4 and/or the line width of plate electrode PT5 is made. A third modification illustrates a configuration in which a position of connection of plate electrode PT4 and/or plate electrode PT5 in addition to the line width of plate electrode PT4 and/or the line width of plate electrode PT5 is changed.

Figure 10:
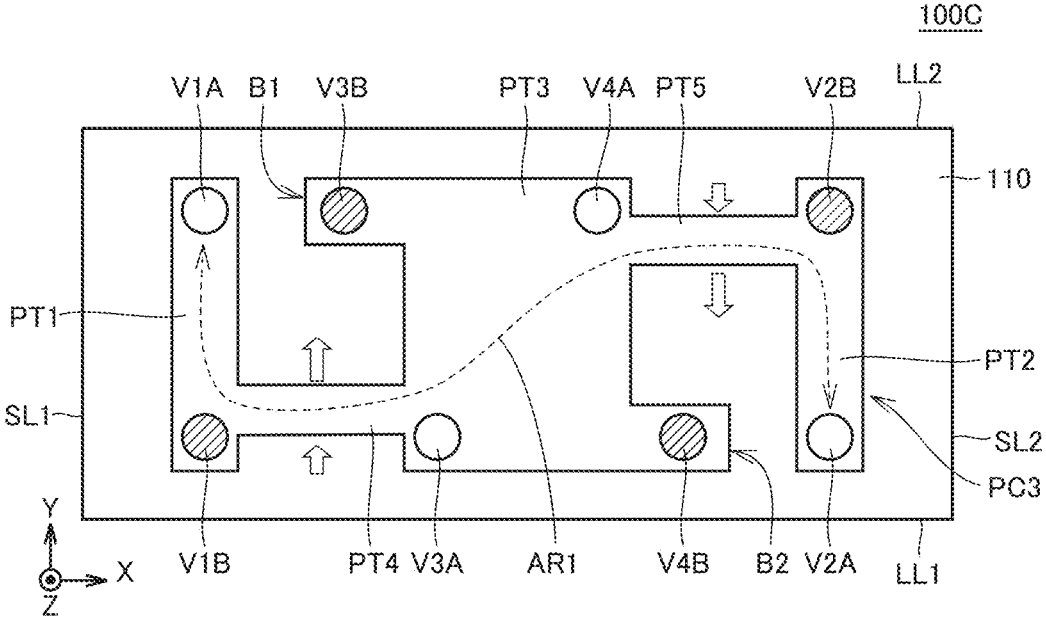
FIG. 10 is a plan view of a common electrode in a filter apparatus in a third modification of an example embodiment of the present invention.

FIG. 10 is a plan view of a common electrode PC3 in a filter apparatus 100C in the third modification. Filter apparatus 100C is configured such that common electrode PC in filter apparatus 100 is replaced with common electrode PC3. Description of elements in filter apparatus 100B the same as or similar to those in filter apparatus 100 will not be repeated.

Referring to FIG. 10, in common electrode PC3 in filter apparatus 100C, a position of connection of plate electrode PT4 from the end of plate electrode PT1 in the negative direction of the Y axis and/or a position of connection of plate electrode PT5 from the end of plate electrode PT2 in the positive direction of the Y axis in addition to the line widths of plate electrodes PT4 and PT5 is/are changed.

By thus changing the line width and the positions of connection of plate electrodes PT4 and PT5, magnetic coupling between resonator RC1 and resonator RC2 and the inductance value of the path from input terminal T1 to output terminal T2 can be individually adjusted. Therefore, characteristics of return loss in the pass band and the attenuation pole on the lower frequency side of the pass band can be adjusted.

(4) Fourth Modification

A fourth modification illustrates a configuration in which a distance between the vias in resonators RC3 and RC4 is adjusted.

Figure 11:
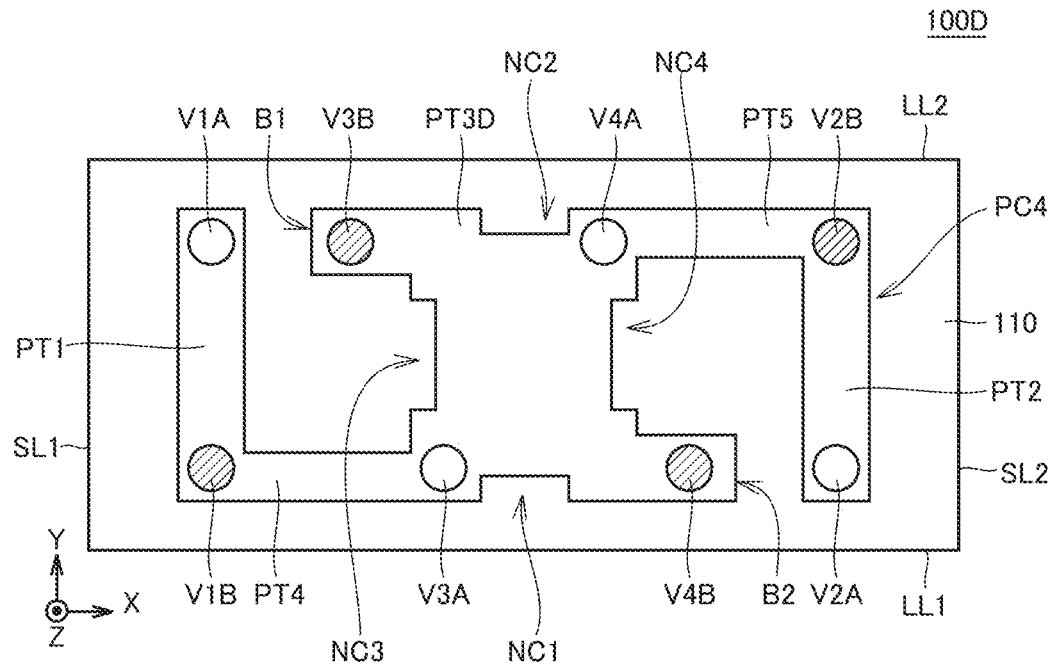
FIG. 11 is a plan view of a common electrode in a filter apparatus in a fourth modification of an example embodiment of the present invention.

FIG. 11 is a plan view of a common electrode PC4 in a filter apparatus 100D in the fourth modification. Filter apparatus 100D is configured such that common electrode PC in filter apparatus 100 is replaced with common electrode PC4. Description of elements in filter apparatus 100D the same as or similar to those in filter apparatus 100 will not be repeated.

Referring to FIG. 11, in common electrode PC4 of filter apparatus 100D, portions along sides of dielectric substrate 110 in a plate electrode PT3D connected to resonators RC3 and RC4 are provided with notches NC1 to NC4, respectively. More specifically, notch NC1 is provided between via V3A and via V4B in a portion along long side LL1 in plate electrode PT3D. Notch NC2 is provided between via V3B and via V4A in a portion along long side LL2 in plate electrode PT3D.

Similarly, notch NC3 is provided between via V3A and via V3B in a portion along short side SL1 in plate electrode PT3D, and notch NC4 is provided between via V4A and via V4B in a portion along short side SL2.

A notch is provided, so that a length of a path between vias in each of resonators RC3 and RC4 in plate electrode PT3D can be adjusted to adjust the inductance value between the paths and magnetic coupling between the resonators. Therefore, the bandwidth of the pass band and/or attenuation characteristics in the non-pass band can be adjusted.

(5) Fifth Modification

A fifth modification illustrates an example in which the common electrode includes plate electrodes in a plurality of dielectric layers.

Figure 12:
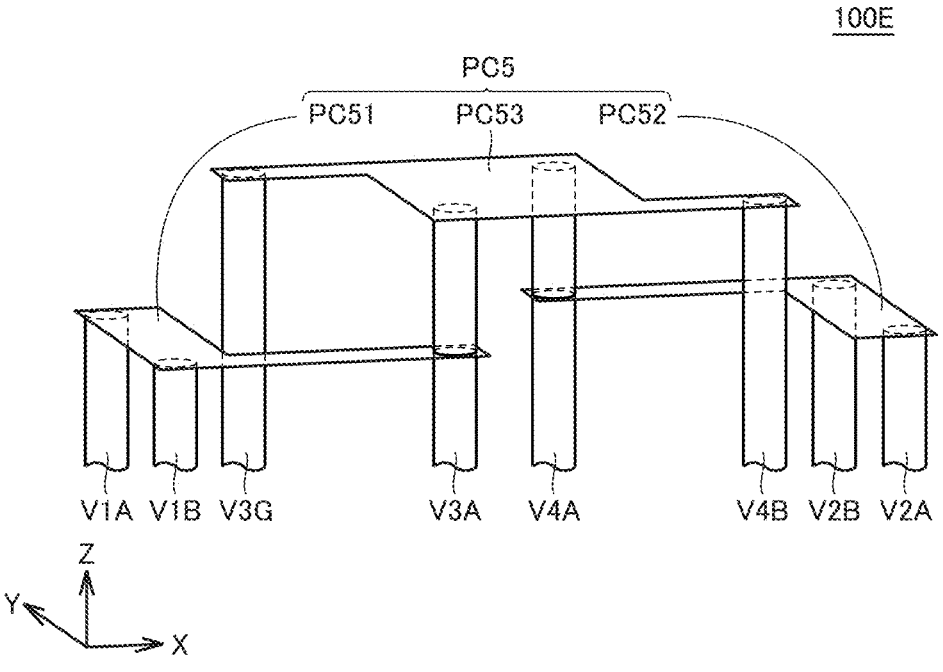
FIG. 12 is a perspective view of a common electrode in a filter apparatus in a fifth modification of an example embodiment of the present invention.

FIG. 12 is a perspective view of a portion of a common electrode PC5 in a filter apparatus 100E in the fifth modification. FIG. 12 does not show a dielectric of dielectric substrate 110.

Referring to FIG. 12, common electrode PC5 in filter apparatus 100E includes an electrode PC53 in a first layer and electrodes PC51 and PC52 in a second layer. Electrode PC51 corresponds to plate electrodes PT1 and PT4 in common electrode PC in filter apparatus 100. Electrode PC52 corresponds to plate electrodes PT2 and PT5 in common electrode PC. Electrode PC53 corresponds to plate electrode PT3 in common electrode PC.

Electrode PC51 and electrode PC53 are connected to each other through via V3A in resonator RC3. Electrode PC52 and electrode PC53 are connected to each other through via V4A in resonator RC4.

According to such a configuration, a length of a path between resonator RC1 and resonator RC2 is longer by a length of the via between electrode PC51 and electrode PC53 and a length of the via between electrode PC52 and electrode PC53. Therefore, magnetic coupling between resonator RC1 and resonator RC2, between resonator RC1 and resonator RC4, and between resonator RC2 and resonator RC3 can be reduced.

(6) Sixth Modification

A sixth modification illustrates another example in which the common electrode includes plate electrodes in a plurality of dielectric layers.

Figure 13:
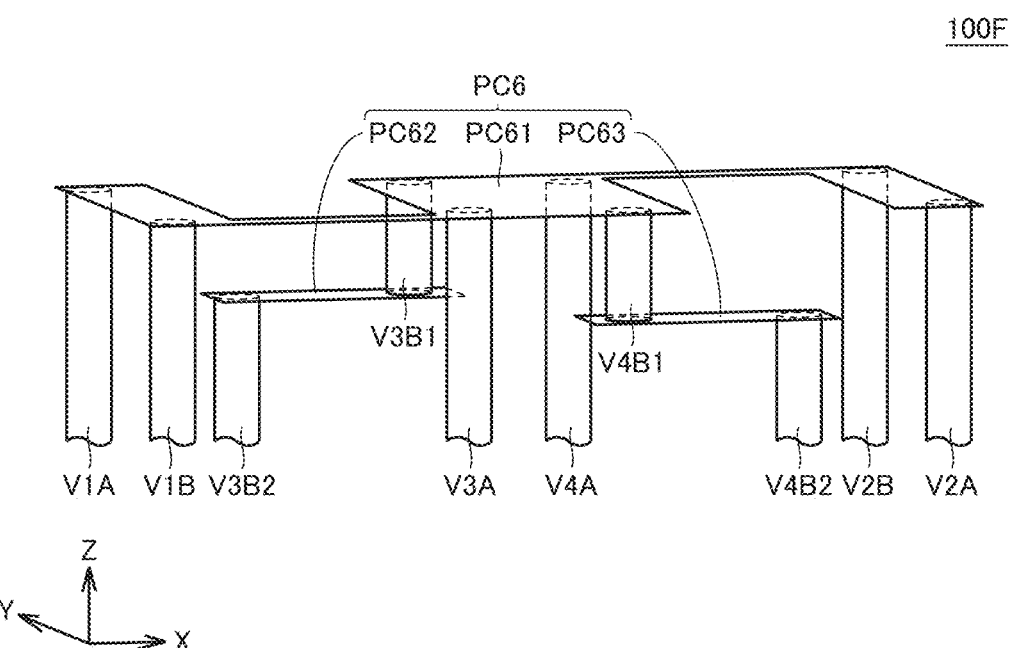
FIG. 13 is a perspective view of a common electrode in a filter apparatus in a sixth modification of an example embodiment of the present invention.

FIG. 13 is a perspective view of a portion of a common electrode PC6 in a filter apparatus 100F in the sixth modification. FIG. 13 does not show a dielectric of dielectric substrate 110.

Referring to FIG. 13, common electrode PC6 in filter apparatus 100F includes an electrode PC61 in a first layer and electrodes PC62 and PC63 in a second layer. Electrode PC61 corresponds to a portion of common electrode PC except for projections B1 and B2. Electrode PC62 corresponds to a portion of projection B1 in common electrode PC, and electrode PC63 corresponds to a portion of projection B2 in common electrode PC.

Electrode PC62 includes one end connected to electrode PC61 through a via V3B1. Electrode PC62 includes the other end connected to ground terminal GND through a via V3B2. Electrode PC63 includes one end connected to electrode PC61 through a via V4B1. Electrode PC63 includes the other end connected to ground terminal GND through a via V4B2.

According to such a configuration, a length of a path from a point of connection between resonator RC3 and ground terminal GND to a point of connection between resonator RC4 and ground terminal GND can be longer to increase magnetic coupling between resonator RC3 and resonator RC4. Therefore, the bandwidth of the pass band can be increased.

(7) Seventh Modification

A seventh modification illustrates a configuration in which influence by another apparatus arranged outside the filter apparatus is lessened by providing a shield electrode on an upper surface side of the common electrode.

Figure 14:
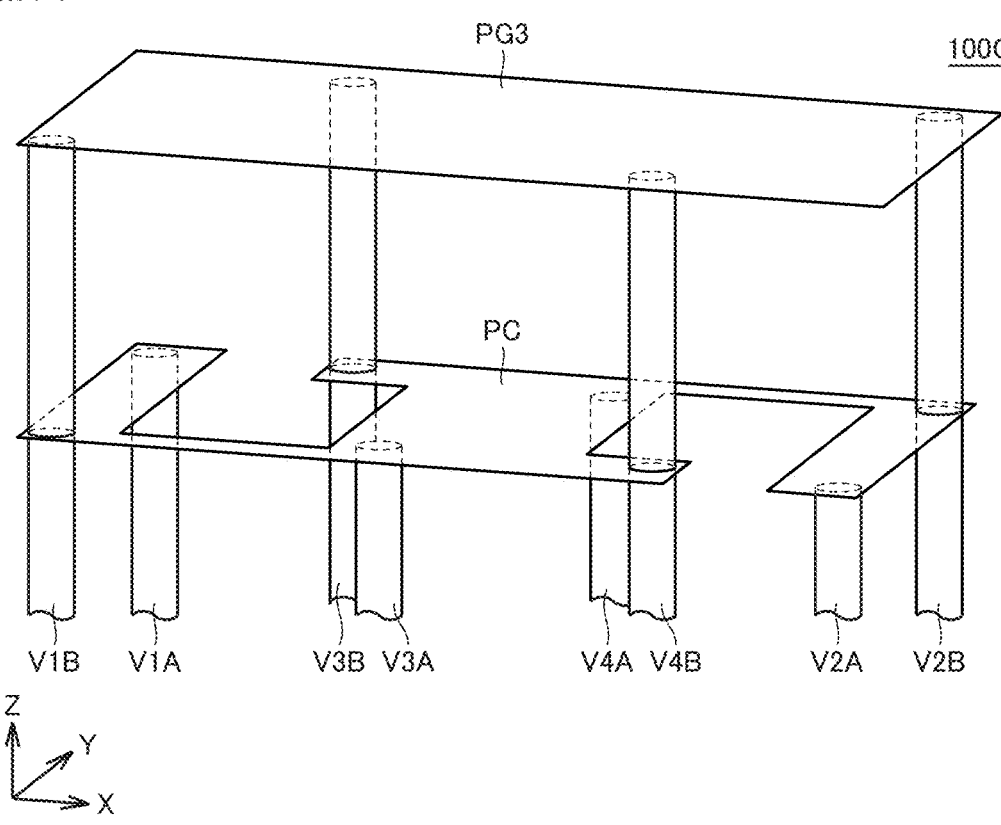
FIG. 14 is a perspective view of a shield electrode in a filter apparatus in a seventh modification of an example embodiment of the present invention.

FIG. 14 is a perspective view of a portion of a shield electrode PG3 in a filter apparatus 100G in the seventh modification. FIG. 14 does not show a dielectric of dielectric substrate 110.

Referring to FIG. 14, in filter apparatus 100G, shield electrode PG3 is closer to upper surface 111 than dielectric layer LY2 where common electrode PC is provided. Shield electrode PG3 has a rectangular or substantially rectangular shape and overlaps with common electrode PC, when dielectric substrate 110 is viewed in the plan view from the normal direction of dielectric substrate 110. Vias V1B, V2B, V3B, and V4B are connected to shield electrode PG3. In other words, shield electrode PG3 has the same or substantially the same electric potential as ground terminal GND and ground electrode PG1.

When no shield electrode PG3 is provided, a current flowing through common electrode PC propagates through a shield of an apparatus or a component outside the filter apparatus, which may generate noise in a signal passing through the filter apparatus. The shield electrode PG3 prevents coupling between common electrode PC and an external apparatus, and thus can prevent generation of noise.

Second Example Embodiment

A second example embodiment of the present invention illustrates a configuration in which the arrangement of the first via and the second via in each of resonator RC3 and resonator RC4 is reverse as compared with that in filter apparatus 100 in the first example embodiment.

Figure 15:
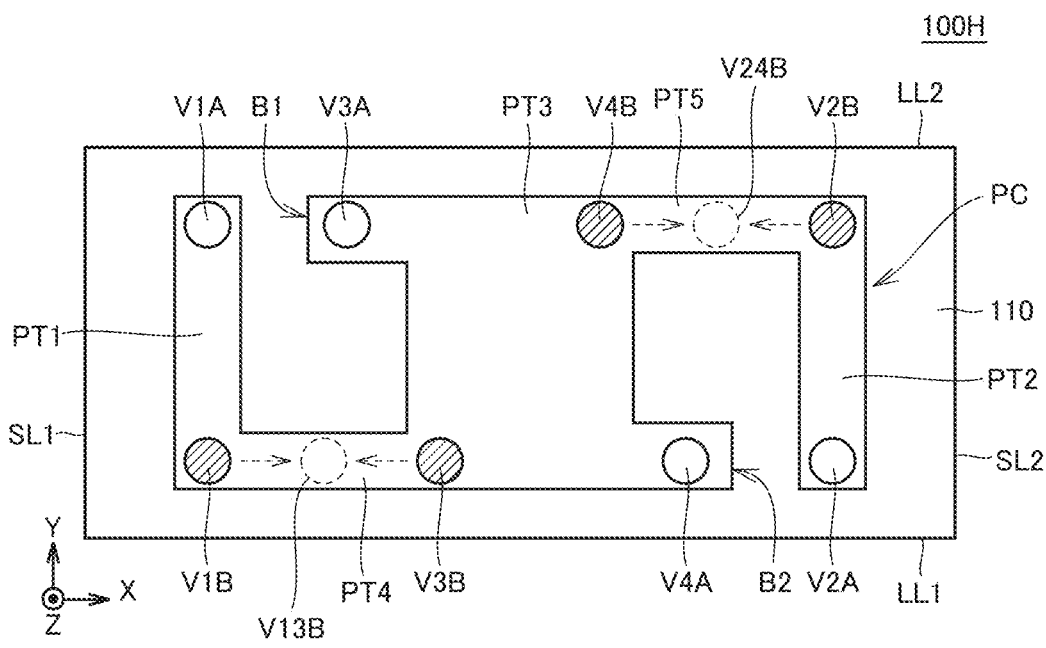
FIG. 15 is a plan view of the common electrode in a filter apparatus according to a second example embodiment of the present invention.

FIG. 15 is a plan view of common electrode PC in a filter apparatus 100H according to a second example embodiment. Common electrode PC in filter apparatus 100H is the same or similar in shape to the common electrode in filter apparatus 100.

In filter apparatus 100H, via V3A in resonator RC3 is provided in projection B1 and via V3B in resonator RC3 is provided in a portion of connection of plate electrode PT3 to plate electrode PT4. Via V4A in resonator RC4 is provided in projection B2 and via V4B in resonator RC4 is provided in a portion of connection of plate electrode PT3 to plate electrode PT5.

Although the shortest path from via V3A to via V4A intersects with the shortest path from via V3B to via V4B in filter apparatus 100H, the shortest path from via V3A to via V4A is longer than the shortest path from via V3B to via V4B due to the arrangement of the vias in resonators RC3 and RC4 in FIG. 15. Magnetic coupling between resonator RC3 and resonator RC4 is thus stronger than in filter apparatus 100. When weaker magnetic coupling between resonator RC3 and resonator RC4 is necessary, via V3B is provided at a position closer toward resonator RC1 along plate electrode PT4, and via V4B is provided at a position closer toward resonator RC2 along plate electrode PT5. By thus adjusting the positions of vias V3B and V4B, magnetic coupling between resonator RC3 and resonator RC4 can be adjusted.

Since via V1B in resonator RC1 and via V3B in resonator RC3 are arranged adjacently along the plate electrode, via V1B and via V3B may be in common such as a via V13B shown with a dashed line in FIG. 15. By moving via V1B toward plate electrode PT3, the inductance value of resonator RC1 can be increased. Similarly, via V2B in resonator RC2 and via V4B in resonator RC4 may be in common such as a via V24B shown with a dashed line.

In filter apparatus 100H, the arrangement of the vias in resonator RC1 is reverse to the arrangement of the vias in resonator RC4, and the arrangement of the vias in resonator RC2 is reverse to the arrangement of the vias in resonator RC3. Therefore, magnetic coupling between resonator RC1 and resonator RC4 and magnetic coupling between resonator RC2 and resonator RC3 are weaker than in filter apparatus 100 in the first example embodiment.

In filter apparatus 100H, the arrangement of the vias in resonator RC1 is the same as the arrangement of the vias in resonator RC3, and the arrangement of the vias in resonator RC2 is the same as the arrangement of the vias in resonator RC4. Therefore, magnetic coupling between resonator RC1 and resonator RC3 and magnetic coupling between resonator RC2 and resonator RC4 are stronger than in filter apparatus 100 in the first example embodiment. In general, magnetic coupling between the resonator in the first stage and the resonator in the second stage and magnetic coupling between the resonator in the third stage and the resonator in the fourth stage are associated with the degree of steepness of attenuation on the lower frequency side of the pass band. Therefore, the configuration of filter apparatus 100H is suitable when the high degree of steepness of attenuation is desired in the vicinity of the lower frequency side of the pass band.

Third Example Embodiment

A third example embodiment of the present invention illustrates a configuration in which the arrangement of the first via and the second via is reversed between resonator RC1 and resonator RC2 in filter apparatus 100 in the first example embodiment.

Figure 16:
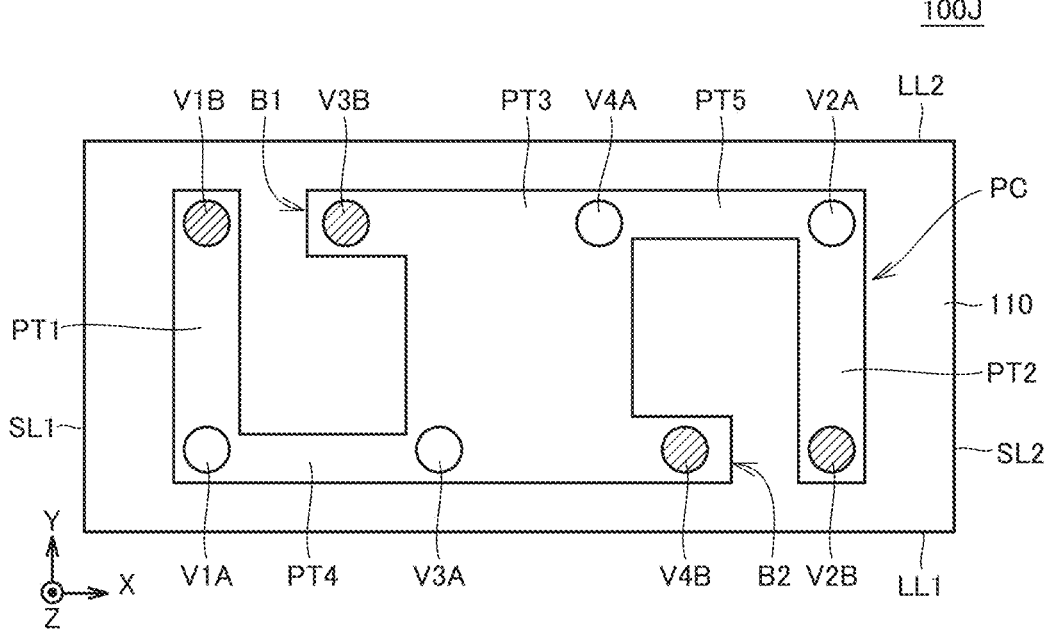
FIG. 16 is a plan view of the common electrode in a filter apparatus according to a third example embodiment of the present invention.

FIG. 16 is a plan view of common electrode PC in a filter apparatus 100J according to the third example embodiment. Common electrode PC in filter apparatus 100J is the same or similar in shape to the common electrode in filter apparatus 100.

In filter apparatus 100J, via V1B in resonator RC1 is provided on the side of the open end of plate electrode PT1 and via V1A in resonator RC1 is provided in the portion of connection to plate electrode PT4. Via V2B in resonator RC2 is provided on the side of the open end of plate electrode PT2 and via V2A in resonator RC2 is provided in the portion of connection to plate electrode PT5.

Since the configuration of resonators RC3 and RC4 in the configuration of filter apparatus 100J is the same as or similar to that in filter apparatus 100 in the first example embodiment, an advantageous effect in connection with the bandwidth of the pass band comparable to that of filter apparatus 100 can be achieved. Since via V1A connected to input terminal T1 and via V2A connected to output terminal T2 are provided at the ends opposite to the open ends of plate electrodes PT1 and PT2, the length of the path from input terminal T1 to output terminal T2 is shorter than in filter apparatus 100. Therefore, the insertion loss in the pass band can be less than in filter apparatus 100.

The arrangement of the vias in resonator RC1 is reverse to the arrangement of the vias in resonator RC4, and the arrangement of the vias in resonator RC2 is reverse to the arrangement of the vias in resonator RC3 in filter apparatus 100J, as in filter apparatus 100H in the second example embodiment. The arrangement of the vias in resonator RC1 is the same as the arrangement of the vias in resonator RC3 and the arrangement of the vias in resonator RC2 is the same as the arrangement of the vias in resonator RC4. Therefore, although magnetic coupling between resonator RC1 and resonator RC4 and magnetic coupling between resonator RC2 and resonator RC3 are weaker than in filter apparatus 100 in the first example embodiment, magnetic coupling between resonator RC1 and resonator RC3 and magnetic coupling between resonator RC2 and resonator RC4 are stronger than in filter apparatus 100 in the first example embodiment. The configuration of filter apparatus 100J is suitable when the degree of steepness of attenuation in the vicinity of the lower frequency side of the pass band higher than in filter apparatus 100H in the third example embodiment is desired.

Fourth Example Embodiment

A fourth example embodiment of the present invention illustrates a configuration in which, in a common electrode, a projection is not provided in the plate electrode to which vias V3A, V3B, V4A, and V4B included in resonators RC3 and RC4 are connected.

Figure 17:
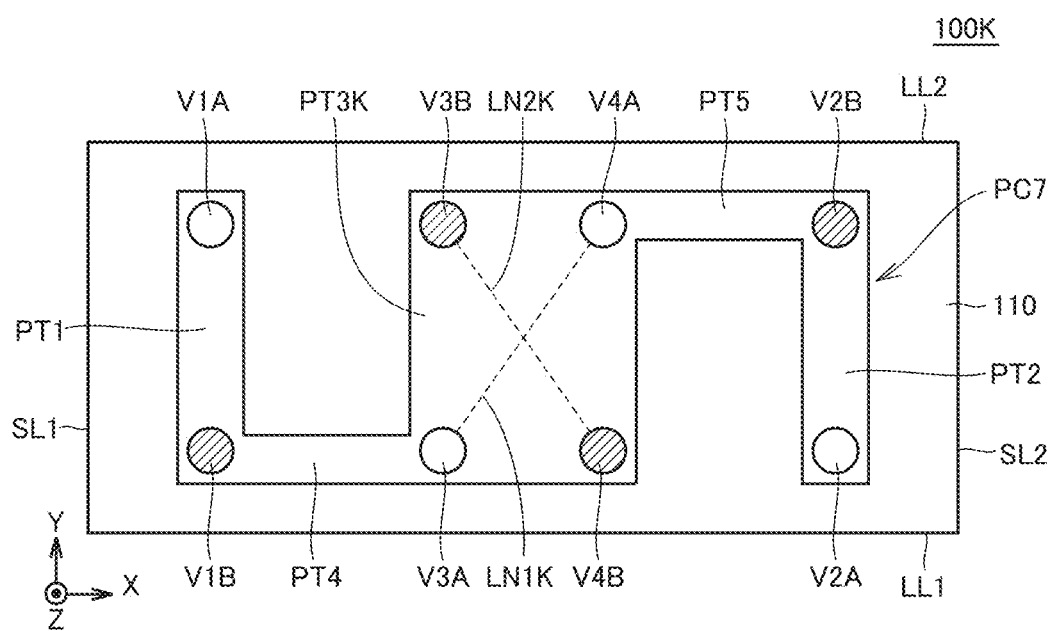
FIG. 17 is a plan view of a common electrode in a filter apparatus according to a fourth example embodiment of the present invention.

FIG. 17 is a plan view of a common electrode PC7 in a filter apparatus 100K according to the fourth example embodiment. In common electrode PC7 in filter apparatus 100K, a plate electrode PT3K connected to resonators RC3 and RC4 has a rectangular or substantially rectangular shape and projection B1 or B2 as in filter apparatus 100 in the first example embodiment is not provided.

In common electrode PC7, via V3B is provided at the end in the positive direction of the Y axis in the side along short side SL1 of dielectric substrate 110 and via V4B is provided at the end in the negative direction of the Y axis in the side along short side SL2 of dielectric substrate 110. In filter apparatus 100K, a shortest path LN1K from via V3A to via V4A along plate electrode PT3K intersects with a shortest path LN2K from via V3B to via V4B.

Since no projection is provided in plate electrode PT3K in filter apparatus 100K, shortest path LN2K from via V3B to via V4B is shorter than shortest path LN2 from via V3B to via V4B in filter apparatus 100. Therefore, since magnetic coupling between resonator RC3 and resonator RC4 is stronger than in filter apparatus 100, the bandwidth of the pass band is slightly smaller. No projection, however, is provided, and therefore the insertion loss in the pass band can be reduced.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A filter apparatus comprising:
a dielectric substrate including a first surface and a second surface;
an input terminal, an output terminal, and a ground terminal on the second surface of the dielectric substrate;
a common electrode inside of the dielectric substrate; and
a first resonator, a second resonator, a third resonator, and a fourth resonator each connected to the common electrode and the ground terminal; wherein
the first resonator is connected to the input terminal;
the second resonator is connected to the output terminal;
the third resonator and the fourth resonator are between the first resonator and the second resonator;
each of the first resonator, the second resonator, the third resonator, and the fourth resonator includes:
a capacitor;
a first via including one end connected to the common electrode and another end connected to the ground terminal with the capacitor interposed therebetween; and
a second via including one end connected to the common electrode and another end connected to the ground terminal without the capacitor interposed therebetween;
in the common electrode, a direction from the first via to the second via in the first resonator is opposite to a direction from the first via to the second via in the second resonator; and
a shortest path along the common electrode from the first via in the third resonator to the first via in the fourth resonator intersects with a shortest path along the common electrode from the second via in the third resonator to the second via in the fourth resonator.

2. The filter apparatus according to claim 1, wherein the common electrode includes:
a first electrode to which the first via and the second via in the first resonator are connected;
a second electrode to which the first via and the second via in the second resonator are connected;
a third electrode to which the first vias and the second vias of each of the third resonator and the fourth resonator are connected;
a fourth electrode connecting the first electrode and the third electrode to each other; and
a fifth electrode connecting the second electrode and the third electrode to each other;
the third electrode includes:
a first projection projecting toward the first electrode; and
a second projection projecting toward the second electrode;
the second via in the third resonator is connected to the first projection; and
the second via in the fourth resonator is connected to the second projection.

3. The filter apparatus according to claim 2, wherein the shortest path along the common electrode from the first via in the third resonator to the first via in the fourth resonator is shorter than the shortest path along the common electrode from the second via in the third resonator to the second via in the fourth resonator.

4. The filter apparatus according to claim 1, wherein the common electrode includes:

a first electrode to which the first via and the second via in the first resonator are connected;

a second electrode to which the first via and the second via in the second resonator are connected;

a third electrode to which the first vias and the second vias of each of the third resonator and the fourth resonator are connected;

a fourth electrode connecting the first electrode and the third electrode to each other; and a fifth electrode connecting the second electrode and the third electrode to each other;

the third electrode includes:

a first projection projecting toward the first electrode; and a second projection projecting toward the second electrode;

the first via in the third resonator is connected to the first projection; and the first via in the fourth resonator is connected to the second projection.

5. The filter apparatus according to claim 2, wherein the first projection and the second projection each have an L or substantially L shape.

6. The filter apparatus according to claim 2, wherein the fourth electrode is connected to a position in the first electrode between the first via and the second via in the first resonator.

7. The filter apparatus according to claim 2, wherein the dielectric substrate has a rectangular or substantially rectangular shape including a first short side, a second short side, a first long side, and a second long side when the dielectric substrate is viewed in a plan view from the first surface;

the first electrode is a band-shaped electrode provided along the first short side;

the second electrode is a band-shaped electrode provided along the second short side;

the fourth electrode extends along the first long side and is connected to an end of the first electrode on a side of the first long side; and the fifth electrode extends along the second long side and is connected to an end of the second electrode on a side of the second long side.

8. The filter apparatus according to claim 7, wherein a notch is provided in at least one of a portion along the first short side, a portion along the second short side, a portion along the first long side, and a portion along the second long side, in the third electrode.

9. The filter apparatus according to claim 2, wherein the third electrode is provided at a position different from the first electrode, the second electrode, the fourth electrode, and the fifth electrode in a direction of extension of each via in the dielectric substrate.

10. The filter apparatus according to claim 2, wherein the first projection and the second projection are provided at positions different from other portions in the third electrode in a direction of extension of each via in the dielectric substrate.

11. The filter apparatus according to claim 1, further comprising:

a shield electrode closer to the first surface of the dielectric substrate than the common electrode and connected to the ground terminal; wherein the shield electrode overlaps with the common electrode when the shield electrode is viewed in a plan view from the first surface of the dielectric substrate.

12. The filter apparatus according to claim 1, wherein the filter apparatus is a band pass filter.

13. A radio-frequency front end circuit comprising:

the filter apparatus according to claim 1.

14. The radio-frequency front end circuit according to claim 13, wherein the common electrode includes:

a first electrode to which the first via and the second via in the first resonator are connected;

a second electrode to which the first via and the second via in the second resonator are connected;

a third electrode to which the first vias and the second vias of each of the third resonator and the fourth resonator are connected;

a fourth electrode connecting the first electrode and the third electrode to each other; and a fifth electrode connecting the second electrode and the third electrode to each other;

the third electrode includes:

a first projection projecting toward the first electrode; and a second projection projecting toward the second electrode;

the second via in the third resonator is connected to the first projection; and the second via in the fourth resonator is connected to the second projection.

15. The radio-frequency front end circuit according to claim 13, wherein the shortest path along the common electrode from the first via in the third resonator to the first via in the fourth resonator is shorter than the shortest path along the common electrode from the second via in the third resonator to the second via in the fourth resonator.

16. The radio-frequency front end circuit according to claim 13, wherein the common electrode includes:

a first electrode to which the first via and the second via in the first resonator are connected;

a second electrode to which the first via and the second via in the second resonator are connected;

a third electrode to which the first vias and the second vias of each of the third resonator and the fourth resonator are connected;

a fourth electrode connecting the first electrode and the third electrode to each other; and a fifth electrode connecting the second electrode and the third electrode to each other;

the third electrode includes:

a first projection projecting toward the first electrode; and a second projection projecting toward the second electrode;

the first via in the third resonator is connected to the first projection; and the first via in the fourth resonator is connected to the second projection.

17. The radio-frequency front end circuit according to claim 14, wherein the first projection and the second projection each have an L or substantially L shape.

18. The radio-frequency front end circuit according to claim 14, wherein the fourth electrode is connected to a position in the first electrode between the first via and the second via in the first resonator.

19. The radio-frequency front end circuit according to claim 14, wherein the dielectric substrate has a rectangular or substantially rectangular shape including a first short side, a second short side, a first long side, and a second long side when the dielectric substrate is viewed in a plan view from the first surface;

the first electrode is a band-shaped electrode provided along the first short side;

the second electrode is a band-shaped electrode provided along the second short side;

the fourth electrode extends along the first long side and is connected to an end of the first electrode on a side of the first long side; and the fifth electrode extends along the second long side and is connected to an end of the second electrode on a side of the second long side.

20. The radio-frequency front end circuit according to claim 19, wherein a notch is provided in at least one of a portion along the first short side, a portion along the second short side, a portion along the first long side, and a portion along the second long side, in the third electrode.

* * * * *